(12) United States Patent
Hejna et al.

(10) Patent No.: US 7,264,796 B2
(45) Date of Patent: *Sep. 4, 2007

(54) TERMITE RESISTANT AND FUNGAL RESISTANT ORIENTED STRAND BOARD AND METHODS FOR MANUFACTURING

(75) Inventors: Donald Hejna, Bemidji, MN (US); Bruce Trebnick, Bovey, MN (US); Ron S. Salisbury, Cloquet, MN (US); Thomas G. Herion, Spokane, WA (US)

(73) Assignee: Potlatch Corporation, Bemidji, MN (US)

( * ) Notice: Subject to any disclaimer, the term of this patent is extended or adjusted under 35 U.S.C. 154(b) by 228 days.

This patent is subject to a terminal disclaimer.

(21) Appl. No.: 10/949,045

(22) Filed: Sep. 24, 2004

(65) Prior Publication Data

US 2005/0037202 A1 Feb. 17, 2005

Related U.S. Application Data

(63) Continuation of application No. 10/137,112, filed on Apr. 30, 2002, now Pat. No. 6,818,317.

(60) Provisional application No. 60/322,644, filed on Sep. 17, 2001, provisional application No. 60/288,136, filed on May 2, 2001.

(51) Int. Cl.
 *A01K 7/021* (2006.01)

(52) U.S. Cl. ............... 424/63; 424/638; 514/383; 514/491; 514/500; 106/18.32

(58) Field of Classification Search ............... 424/63, 424/638; 514/383, 481, 500; 106/18.32
See application file for complete search history.

(56) References Cited

U.S. PATENT DOCUMENTS

| | | | | |
|---|---|---|---|---|
| 4,175,090 A * | 11/1979 | Berry | ............... | 556/116 |
| 4,364,984 A | 12/1982 | Wentworth | ............... | 428/106 |
| 4,407,999 A | 10/1983 | Fushiki et al. | ............... | 524/276 |
| 4,510,725 A | 4/1985 | Wilson | ............... | 52/309.1 |
| 4,514,532 A | 4/1985 | Hsu et al. | ............... | 524/14 |
| 4,758,478 A | 7/1988 | Daisy et al. | ............... | 428/539 |
| 5,425,908 A | 6/1995 | Merser | ............... | 264/46.4 |
| 5,552,095 A | 9/1996 | Merser et al. | ............... | 264/46.4 |
| 5,554,429 A | 9/1996 | Iwata et al. | ............... | 428/105 |
| 5,635,118 A | 6/1997 | Merser | ............... | 264/46.4 |
| 5,635,217 A | 6/1997 | Goettsche et al. | ............... | 424/632 |
| 5,700,587 A | 12/1997 | Shiau et al. | ............... | 428/528 |
| 5,714,099 A | 2/1998 | Merser | ............... | 264/46.4 |
| 5,861,119 A | 1/1999 | Merser | ............... | 264/46.4 |
| 5,951,795 A | 9/1999 | Calve et al. | ............... | 156/62.8 |
| 5,974,760 A | 11/1999 | Tingley | ............... | 52/729.1 |
| 6,028,133 A | 2/2000 | Peek et al. | ............... | 524/276 |
| RE36,798 E | 8/2000 | Williams et al. | ............... | 106/18.32 |
| 6,132,549 A | 10/2000 | Nieckarz et al. | ............... | 156/335 |
| 6,132,885 A | 10/2000 | Peek et al. | ............... | 428/485 |
| 6,136,408 A | 10/2000 | Radcliffe et al. | ............... | 428/107 |
| 6,606,155 B1 | 8/2003 | Ross et al. | ............... | 356/317 |
| 6,818,317 B2 * | 11/2004 | Hejna et al. | ............... | 428/535 |

OTHER PUBLICATIONS

Brock, Thomas D., "Algae, Fungi, Molds, Yeasts, Slime Molds", *In: Biology of microorganisms (From Chapter 21—Eucaryotic Microorganisms)*, Englewood Cliffs, N.J. : Prentice Hall, 6th Edition,(1991),815-822.

Christiansen, Alfred W., et al., "International contributions to wood adhesion research", *Madison, WI : Forest Products Society*, (1999),Book.

Forest Products Society, "Forest Products Society Publications", http://www.forestprod.org, (2004).

Forest Products Society, "Wood adhesives 2000 : extended abstracts", *Madison, WI : The Society*, (2000),Book.

Lee, Henry, "Cyanoacrylate resins: the instant adhesives : a monograph of their applications and technology", *[Pasadena, Calif.] : Los Angeles, CA : Pasadena Technology Press*, (1986),Book.

Pizzi, A , et al., "Handbook of adhesive technology", *New York : M. Dekker*, (1994),Book.

Potter, Kevin , "Resin transfer moulding", *London ; New York : Chapman & Hall*, 1st Edition,(1997),Book.

Satas, Donatas , "Handbook of pressure sensitive adhesive technology", *Warwick, RI : Satas & Associates*, 3rd Edition,(1999),Book.

Stedman, Thomas L., "Mold & Basidomycetes—Dictionary Definitions", *Stedman's medical dictionary, Baltimore : Williams & Wilkins*, 25th Edition,(1990),175 & 975.

* cited by examiner

*Primary Examiner*—Leszek B. Kiliman
(74) *Attorney, Agent, or Firm*—Schwegman, Lundberg, Woessner & Kluth P.A.

(57) ABSTRACT

The present invention provides for wood based panels (e.g., OSB or plywood) that are termite resistant, fungal resistant, or a combination thereof; and methods of manufacturing the same.

58 Claims, 2 Drawing Sheets

TERMITE RESISTANT AND FUNGAL RESISTANT ORIENTED STRAND BOARD AND METHODS FOR MANUFACTURING

RELATED APPLICATION

This patent application is a continuation of U.S. application Ser. No. 10/137,112 filed on Apr. 30, 2002, now issued as U.S. Pat. No. 6,818,317; which claims priority to U.S. Ser. No. 60/288,136, filed May 2, 2001; and U.S. Ser. No. 60/322,644, filed Sep. 17, 2001. These applications are incorporated herein by reference.

BACKGROUND OF THE INVENTION

Oriented Strand Board (OSB) is an engineered structural-use panel typically manufactured from thin wood strands bonded together with resin under heat and pressure, and it is used extensively for roof, wall, and floor sheathing in residential and commercial construction. Orientation of wood strands with a typical aspect ratio (i.e., strand length divided by width) of at least 3 can produce a panel product with greater bending strength and stiffness in the oriented or aligned direction.

In the general manufacturing process for OSB, debarked logs are often heated in soaking ponds, then sliced into thin wood elements. The strands are typically dried, blended with resin and wax, and formed into thick, loosely consolidated mats or blankets that are pressed under heat and pressure into large panels. Oriented strand board is made from long, narrow strands, with the strands that comprise the face layers aligned parallel to one another. The strands in the core layers are usually aligned perpendicular to the strand alignment of the face layers, like the cross-laminated veneers of plywood. The strand length to width ratio and resulting orientation give OSB its unique characteristics and allows it to be engineered to suit different uses.

Typically, logs are debarked and then sent to a soaking pond or directly to the stranding process. Long log disk or ring flakers are commonly used to produce wood strands typically measuring 114 mm to 152 mm (4.5 in. to 6 in.) long, 12.7 mm (0.5 in.) wide, and 0.6 mm (0.023 in.) to 0.7 mm (0.027 in.) thick. These strand dimensions are currently accepted industry norms but longer strands (e.g., greater than 6 inches in length and greater than 0.030 inches in thickness) used to comprise the core layers may be better suited to improve panel performance attributes.

Green strands are collected in wet bins and then dried in a dryer. The dryer can be, e.g., a traditional triple-pass dryer, a single-pass dryer, a combination triple-pass/single-pass dryer, or a three-section conveyor. A relatively recent development is a dryer in which the strands are laid on a chain mat and the strands are held in place as they move through the dryer. The introduction of new drying techniques allows the use of longer strands, reduces surface inactivation of strands, and lowers dryer outfeed temperatures. Dried strands are screened and sent to dry bins.

The blending of strands with adhesive and wax is a highly controlled operation, with separate rotating blenders used for face and core strands. Typically, different resin formulations are used for face and core layers. Face resins are typically liquid or powdered phenolics, whereas core resins are typically liquid or powder phenolics or isocyanates. Several different resin applicators are used; spinning disk resin applicators are frequently used.

Mat formers take on a number of configurations, ranging from electrostatic equipment to mechanical devices containing spinning disks or other types of equipment to align strands along the panel's length and/or width. Most forming equipment uses the long and narrow characteristics of the strand to achieve strand alignment onto a moving caul plate or conveyor belt below the forming heads. Oriented layers of strands within the mat—face, core, face, for example—are dropped sequentially, each by a different forming head. Modern mat formers either use wire screens to carry the mat into the press or screenless systems in which the mat lies directly on the conveyor belt.

In hot pressing, the loose layered mat of oriented strands is typically compressed under heat and pressure to cure the resin. As many as sixteen 3.7 m (12 ft.) by 7.3 m (24-ft) panels may be formed simultaneously in a multiple-opening press. A more recent development is the continuous press for OSB. The press compacts and consolidates the oriented and layered mat of strands and heats it to 350° F. (177° C.) to 450° F. (232° C.) to cure the resin in 3 to 9 min. Other current techniques exit.

Design capacities of performance-rated products, which include OSB and plywood can be determined by using procedures outlined in Technical Note N375B (APA—The Engineered Wood Association 1995a). Additional adjustment factors based on panel grade and construction are also provided.

Oriented strand board (OSB) and methods for producing the same are generally known and are disclosed, e.g., in U.S. Pat. Nos. 6,136,408; 6,098,679; 5,718,786; 5,525,394; 5,470,631; 5,443,894; 5,425,976; 5,379,027; 4,364,984; 3,173,460; 4,893,415; 4,017,980; 3,098,781; 4,364,984; 4,068,991; 2,343,740; 3,308,013; 4,361,612; 3,164,511; 1,023,606; 4,058,906; 4,198,763; 3,685,959; 3,811,200; 4,194,296; and references cited therein. For example, oriented strand board (OSB) is commercially available from vendors such as Morgan Timber (Bibra Lake, Australia); Ainsworth Lumber (Grand Prairie, Canada); Ainsworth Lumber (100 Mile House, Canada); Grant Forest Products (Englehart, Canada); Louisiana-Pacific Canada (Saint Michel des Saints, Canada); Louisiana-Pacific Canada (Bois Franc, Canada); Louisiana-Pacific Corp. (Swan River, Canada); Louisiana-Pacific Corp. (Minitonas, Canada); Louisiana-Pacific Corp. (Dawson Creek, Canada); MacMillan Bloedel Ltd. (Hudson Bay, Canada); Norbord Industries Inc. (LaSarre, Canada); Norbord Industries Inc. (Val D'or, Canada); Sloan Forest Products (Ft. Nelson, Canada); Tolka Industries (High Prairie, Canada); Voyageur Panel (Boise Cascade) (Barwick, Canada); Weyerhaeuser (Ontario, Canada); Weyerhaeuser (Drayton Valley, Canada); Weyerhaeuser (Slave Lake, Canada); DLH A/S (Teastrup, Denmark); E & V Int' Ltd. (Central, Hong Kong); Louisiana-Pacific Corp. (Hanceville, Ala.); Cooley For. Prod. (Phoenix, Ariz.); Georgia-Pacific Corp. (Monticello, Ariz.); Allied Veneer Co. (Los Angeles, Calif.); Dotable Products Inc. (Chino, Calif.); Plylap Industries Inc. (Woodland, Calif.); Louisiana-Pacific Corp. (Montrose, Colo.); J. M. Huber Corp. (Commerce, Ga.); Norbord Industries (Cordele, Ga.); Langboard Inc. (Quitman, Ga.); Louisiana-Pacific Corp. (Athol, Id.); National Products Inc. (Syracuse, Ind.); Seemac Inc. (Carmel, Ind.); Robert Weed Plywood (Briston, Ind.); Louisiana-Pacific Corp. (Urania, La.); Martco Partnership, (Alexandria, La.); Martco Partnership (Morrow, La.); Weyerhaeuser Co. (Simsboro, La.); Georgia-Pacific (Woodland, Me.); J. M. Huber Corp. (Easton, Me.); Louisiana-Pacific Corp. (Houlton, Me.); Dyson Lumber Co. (Great Mills, Mo.); Kimball Co. (Longmeadow, Mass.); Louisiana-Pacific Corp. (Newberry, Mich.); Louisiana-Pacific Corp. (Sagola, Mich.);Nova Forest Products Co. (Milford, Mich.); Weyerhaeuser Co. (Grayling, Mich.); Louisiana-Pacific Corp. (Two Harbors, Minn.); Northwood Panelboard Co. (Solway, Minn.); Potlatch Corp. (Bemidji, Minn.); Potlatch Corp. (Cook, Minn.); Potlatch Corp., Grand Rapids (Grand Rapids, Minn.); Georgia-Pacific (Duck Hill, Miss.); Norbord Industries Inc. (Guntown, Miss.); Georgia-Pacific (Dudley, N.C.); Weyerhaeuser Co. (Elkin, N.C.); Horizon Trading Co. (Lake Oswego, Oreg.); Plymart Inc. (Boring, Oreg.); Timber Prod. Co. (Springfield, Ohio); Norbord Industries Inc. (Joanna, S.C.); J. M. Huber Corp. (Spring City, Tenn.); Norbord Industries Co. (Nacogdoches, Tex.); Norbord Industries Corp. (Jefferson, Tex.); Louisiana-Pacific Corp. (Jasper, Tex.); Louisiana-Pacific Corp. (Silsbee, Tex.); Georgia-Pacific (Skippers, Va.); Georgia-Pacific Corp. (Brookneal, Va.); J. M. Huber Corp. (Crystal Hill, Va.); Louisiana-Pacific Corp. (Dungannon, Va.); Eagon Forest Products (Bellevue, Wash.); Georgia-Pacific (Mount Hope, W. Va.); Weyerhaeuser Co. (Sutton, W. Va.); L P Hayward (Hayward, Wis.); and Midwest Lumber Associates (Middleton, Wis.). Additionally, oriented strand board (OSB) is commercially available from trade associations such as American Forest & Paper Assn. (Washington, D.C.); American Wood Preserves Inst. (Fairfax, Va.); American Wood-Preservers' Assn. (Granbury, Tex.); APA—Engineered Wood Assn. (Tacoma, Wash.); Forest Products Society (Madison, Wis.); Forintek Canada Corp. (Vancouver, BC); Structural Board Assn. (Toronto, Canada); and British Wood Preserving & Damp-Proofing Assn. (Derby, England).

One drawback associated with known oriented strand boards (OSB) is that they are susceptible to decomposition by both termites and fungus. The problem is especially pronounced in the south eastern corridor of the United States (e.g., Florida and Louisiana). Several pesticides and fungicides have been used in the pressure treatment of wood. The resulting pressure treated wood products are resistant to fungus and termites. However, many of these compounds are either extremely poisonous or are not suitable in the OSB manufacturing process.

Specifically, arsenic containing compounds, borates, and halogenated compounds (e.g., chromated copper arsenate (CCA), ammoniacal copper quat (ACQ), ammoniacal copper zinc arsenate (ACZA), creosote, and pentachlorophenol) have been used with limited success in the pressure treated wood industry. Arsenic is poisonous and its use has been criticized by several environmental groups. Additionally, the use of many known pesticides and fungicides to produce oriented strand boards results in an oriented strand board with unacceptable physical properties. For example, many pesticides or fungicides may undergo physical decomposition during the extreme conditions (e.g., temperature and pressure) typically experienced in the pressing stage (i.e., the step in which the resin is cured). As such, the resulting oriented strand board may not even be resistant to termites or fungal infections. Additionally, the pesticide or fungicide may not be chemically compatible with the resin. Moreover, the pesticide or fungicide may lose its effectiveness over an extended period of time (e.g., about 25 years) and under normal weather conditions (e.g., rain, snow, heat, exposure to UV light, etc.). For example, the pesticide or fungicide may leach out of the OSB over an extended period of time and under normal weather conditions.

As such, what is needed is a termite resistant OSB, a fungal resistant OSB, or a combination thereof; and processes for making the same. The termite resistant OSB, the fungal resistant OSB, or the combination thereof, should include a fungicide, pesticide, or combination thereof that retains its effectiveness (i.e., antifungal properties, pesticidal properties, or a combination thereof) during the manufacturing of the OSB. The termite resistant OSB, the fungal resistant OSB, or a combination thereof, should include an fungicide, a pesticide, or a combination thereof that retains its effectiveness over the extended periods of time typically encountered with the lifespan of the oriented strand board (e.g., up to about 25 years, up to about 50 years, or up to about 100 years). During the manufacture and over the lifespan of the OSB, the fungicide, pesticide, or combination thereof should remain stable in the presence of the resin. The fungicide, pesticide, or combination thereof will preferably be inexpensive, easy to manufacture, convenient to use, environmentally safe, and/or chemically stable.

SUMMARY OF THE INVENTION

The present invention provides a wood-based composite panel (e.g., oriented strand board or plywood) and processes for making the same. The wood-based composite panel includes at least one of a fungicide and a pesticide. The fungicide, pesticide, or combination thereof can be less expensive, easier to handle, more chemically compatible with suitable resins, more environmentally friendly and/or less toxic than many known fungicides and pesticides.

The fungicide, pesticide, or combination thereof retains its effectiveness during the manufacturing of the wood-based composite panel and over the extended periods of time typically encountered with the lifespan of the wood-based composite panel (e.g., up to about 25 years, up to about 50 years, or up to about 100 years). Specifically, during the manufacture and over the lifespan of the wood-based composite panel of the present invention, the fungicide, pesticide, or combination thereof remains stable in the presence of the resin. As such, the resin can effectively cure in the presence of the fungicide, pesticide, or combination thereof. Additionally, the wood-based composite panel of the present invention meets any current requirements to be certified as an antifungal resistant wood-based composite panel, a termite-resistant wood-based composite panel, or a combination thereof.

The present invention provides a flake of wood that includes at least one of a fungicide and a pesticide; wherein the fungicide, pesticide, or combination thereof covers at least a portion of the surface of the flake of wood, at least partially impregnates the flake of wood, or covers at least a portion of the surface of the flake of wood and at least partially impregnates the flake of wood.

The present invention also provides a veneer of wood that includes at least one of a fungicide and a pesticide; wherein the fungicide, pesticide, or combination thereof covers at least a portion of the surface of the veneer of wood, at least partially impregnates the veneer of wood, or covers at least a portion of the surface of the veneer of wood and at least partially impregnates the veneer of wood.

The present invention also provides a product that includes a flake of wood and at least one of a pesticide and a fungicide; wherein the pesticide, fungicide, or combination thereof covers at least a portion of the surface of the flake of wood, at least partially impregnates the flake of wood, or covers at least a portion of the surface of the flake of wood and at least partially impregnates the flake of wood.

The present invention also provides a product that includes a veneer of wood and at least one of a pesticide and a fungicide; wherein the pesticide, fungicide, or combination thereof covers at least a portion of the surface of the veneer of wood, at least partially impregnates the veneer of wood, or covers at least a portion of the surface of the veneer of wood and at least partially impregnates the veneer of wood.

The present invention also provides an oriented strand board that includes: (i) flakes of wood; (ii) at least one of a pesticide and a fungicide; wherein the pesticide, fungicide, or combination thereof covers at least a portion of the surface of the flakes of wood, at least partially impregnates the flakes of wood, or covers at least a portion of the surface of the flakes of wood and at least partially impregnates the flakes of wood, and (iii) a resin that contacts at least a portion of the flakes of wood.

The present invention also provides a plywood that includes: (i) veneers of wood; (ii) at least one of a pesticide and a fungicide, wherein the pesticide, fungicide, or combination thereof covers at least a portion of the surface of the veneers of wood, at least partially impregnates the veneers of wood, or covers at least a portion of the surface of the veneers of wood and at least partially impregnates the veneers of wood; and (iii) a resin that contacts at least a portion of the veneers of wood.

The present invention also provides an oriented strand board prepared by the process that includes the following steps: (i) contacting flakes of wood with a resin; (ii) orienting, in alternate lengthwise and crosswise layers, the flakes of wood to provide a blanket of oriented flakes; and (iii) curing the resin by exposing the resin to at least one of an elevated temperature, an elevated pressure, and radiant energy; for a sufficient period of time; to effectively cure the resin; wherein the flakes of wood, prior to curing the resin, are contacted with at least one of a pesticide and a fungicide.

The present invention also provides a plywood prepared by the process that includes the following steps: (i) contacting veneers of wood with a resin; (ii) stacking the of veneers of wood to form a stack; and (ii) curing the resin by exposing the resin to at least one of an elevated temperature, an elevated pressure, and radiant energy; for a sufficient period of time; wherein the veneers of wood, prior to curing the resin, are contacted with at least one of a pesticide and a fungicide.

The present invention also provides an oriented strand board that includes: (i) flakes of wood; (ii) at least one of a pesticide and a fungicide, wherein the pesticide, fungicide, or combination thereof covers at least a portion of the surface of the flakes of wood, at least partially impregnates the flakes of wood, or covers at least a portion of the surface of the flakes of wood and at least partially impregnates the flakes of wood; and (iii) a resin that contacts at least a portion of the flakes of wood; the fungal resistant and a termite resistant oriented strand board prepared by the process that includes the following steps: (i) contacting the flakes of wood with the resin; (ii) orienting, in alternate lengthwise and crosswise layers, the flakes of wood to provide a blanket of oriented flakes; and (iii) curing the resin by exposing the resin to at least one of an elevated temperature, an elevated pressure, and radiant energy; for a sufficient period of time; wherein the flakes of wood, prior to curing the resin, are contacted with the pesticide, fungicide, or combination thereof.

The present invention also provides a plywood that includes: (i) veneers of wood; (ii) at least one of a pesticide and a fungicide, wherein the pesticide, fungicide, or combination thereof covers at least a portion of the surface of the veneers of wood, at least partially impregnates the veneers of wood, or covers at least a portion of the surface of the veneers of wood and at least partially impregnates the veneers of wood; (iii) a resin that contacts at least a portion of the veneers of wood; the fungal resistant and a termite resistant plywood prepared by the process that includes the following steps: (i) contacting the veneers of wood with the resin; (ii) stacking the of veneers of wood to form a stack; and (ii) curing the resin by exposing the resin to at least one of an elevated temperature, an elevated pressure, and radiant energy; for a sufficient period of time; wherein the veneers of wood, prior to curing the resin, are contacted with the pesticide, fungicide, or combination thereof.

The present invention also provides a method for producing an oriented strand board that includes: (i) contacting flakes of wood with a resin; (ii) orienting, in alternate lengthwise and crosswise layers, the flakes of wood to provide a blanket of oriented flakes; and (iii) curing the resin by exposing the resin to at least one of an elevated temperature, an elevated pressure, and radiant energy; for a sufficient period of time; wherein the flakes of wood, prior to curing the resin, are contacted with a pesticide, fungicide, or combination thereof.

The present invention also provides a method for producing a plywood that includes: (i) contacting veneers of wood with a resin; (ii) stacking the of veneers of wood to form a stack; and (ii) curing the resin by exposing the resin to at least one of an elevated temperature, an elevated pressure, and radiant energy; for a sufficient period of time; to effectively cure the resin; wherein the veneers of wood, prior to curing the resin, are contacted with at least one of a fungicide and a pesticide.

DETAILED DESCRIPTION OF THE INVENTION

Figure 1:
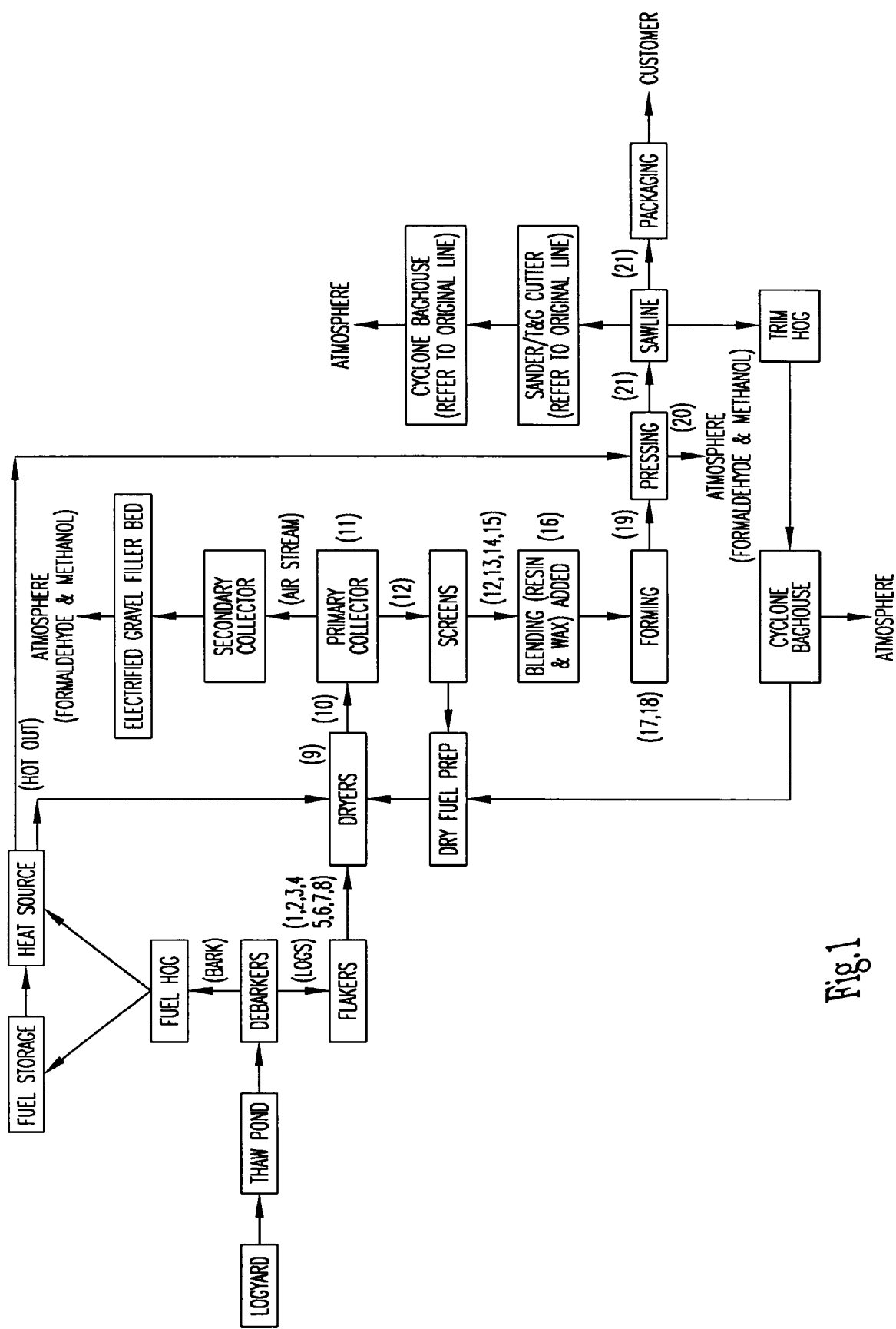
FIG. 1 illustrates a process flow of a termite resistant oriented strand board (OSB), a fungal resistant oriented strand board (OSB), or a combination thereof; wherein the possible locations and methods in which the resin and at least one of the pesticide and the fungicide could independently be introduced and applied are shown in numerals (which correspond to Tables I–IV).

The present invention provides a wood-based composite panel (e.g., oriented strand board or plywood) and processes for making the same. The wood-based composite panel includes at least one of a fungicide and a pesticide. The fungicide, pesticide, or combination thereof can be less expensive, easier to handle, more chemically compatible with suitable resins, more environmentally friendly and/or less toxic than many known fungicides and pesticides.

The fungicide, pesticide, or combination thereof retains its effectiveness during the manufacturing of the wood-based composite panel and over the extended periods of time typically encountered with the lifespan of the wood-based composite panel (e.g., up to about 25 years, up to about 50 years, or up to about 100 years). Specifically, during the manufacture and over the lifespan of the wood-based composite panel of the present invention, the fungicide, pesticide, or combination thereof remains stable in the presence of the resin. As such, the resin can effectively cure in the presence of the fungicide, pesticide, or combination thereof.

Additionally, the wood-based composite panel of the present invention meets any current requirements to be certified as an antifungal resistant wood-based composite panel, a termite-resistant wood-based composite panel, or a combination thereof.

The present invention provides a wood-based composite panel (e.g., oriented strand board or plywood) and processes for making the same. The wood-based composite panel includes at least one of a fungicide and a pesticide. When describing the wood-based composite panel and the method of making such a wood-based composite panel of this invention, the following terms have the following meanings, unless otherwise indicated.

Definitions

As used herein, a "wood-based composite panel" refers to structural or non-structural product formed from a variety of materials including wood and/or wood substrate products (e.g., flakes or strands of wood, as well as veneers of wood). These materials are optionally formed from moisture-containing substrates, permeable substrates, and substrates which are both moisture-containing and permeable. Suitable wood-based composite panels include, e.g., oriented strand board (OSB) and plywood.

As used herein, "oriented strand board" or "OSB" refers to an engineered structural-use panel typically manufactured from thin wood strands bonded together with resin under heat, pressure, and/or radiant energy. The strands are typically dried, blended with resin and wax, and formed into thick, loosely consolidated mats or blankets that are pressed under heat and pressure into large panels. The strands in the core layers are usually aligned perpendicular to the strand alignment of the face layers, like the cross-laminated veneers of plywood. It is appreciated that those of skill in the art understand that OSB is typically characterized by those starting materials or intermediate components useful in making the OSB, e.g., resin and flakes of wood. While these materials may undergo a substantial conversion during the manufacturing of the OSB, reference to OSB as including these materials or components is acceptable and appropriate to those of skill in the art. For example, each of the flakes of wood and the resin, during the pressing step (e.g., curing), can undergo a chemical and/or physical conversion such that they will no longer expressly and literally meet the criteria to be classified as a resin and a flake of wood. Reference to the OSB as including a resin and flakes of wood is, however, acceptable and appropriate to those of skill in the art. As such, as used herein, "oriented strand board" includes resin and flakes of wood.

As used herein, a "flake" refers to a thin stand of wood that is produced from a flaker. In addition, as used herein, a "green flake" refers to a flake that has not been dried. The flake can have any suitable size, provided the flake can be effectively cured with a suitable resin. For example, the flake can typically have a length (y-dimension) of up to about 12 inches (30.4 cm) or about 4.5 inches (11.4 cm) to about 6.0 inches (15.2 cm) and can typically have a width (x-dimension) of up to about 12 inches (30.4 cm) or about 1.5 inches (3.8 cm) to about 2.5 inches (6.4 cm). Likewise, the flake can typically have a thickness (z-dimension) of about 0.001 inches (0.0025 cm) to about 0.10 inches (0.254 cm), about 0.010 inches (0.0254 cm) to about 0.060 inches (0.1524 cm), or about 0.020 inches (0.0508 cm) to about 0.030 inches (0.076 cm). Typically, the width of the flake will be a function of the length of the flake. The length of the flake is typically at least about three times greater than the width of the flake. This allows for proper flake orientation and an OSB with acceptable physical properties.

As used herein, "blanket of flakes" refers to a plurality or mass of flakes having a discrete length, width, and height. The blanket of flakes can be formed, e.g., on a mat or a screen. A cross-sectional view of the blanket of flakes will typically illustrate that the flakes exist in multiple layers, thereby forming the blanket of flakes. The blanket of flakes can typically have a width of up to about 16 feet, of up to about 12 feet, up to about 8 feet, or up to about 4 feet. The blanket of flakes can typically have a length of up to about 48 feet, of up to about 36 feet, or up to about 24 feet. The blanket of flakes can typically have a thickness of up to about 2 feet, of up to about 1 foot, of up to about 8 inches, of up to about 6 inches, or of up to about 2 inches.

As used herein, "blanket of oriented flakes" refers to a blanket of flakes, as used herein, wherein each layer has flakes that are substantially perpendicular to the flakes in the layer directly below that specified layer (if present) and are substantially perpendicular to the flakes in the layer directly above that specified layer (if present).

As used herein, "plywood" refers to a laminate wood-based composite panel manufactured from thin wood veneers (i.e., laminates) bonded together with resin under heat and pressure. It is appreciated that those of skill in the art understand that plywood is typically characterized by those starting materials or intermediate components useful in making the plywood, e.g., resin and veneers of wood. While these materials may undergo a substantial conversion during the manufacturing of the plywood, reference to the plywood as including these materials or components is acceptable and appropriate to those of skill in the art. For example, each of the veneers of wood and the resin, during the pressing step (e.g., curing), can undergo a chemical and/or physical conversion such that they will no longer expressly meet the criteria to be classified as a resin and a veneer of wood. Reference to the plywood as including a resin and veneers of wood, however, is acceptable and appropriate to those of skill in the art. As such, as used herein, "plywood" includes resin and veneers of wood.

Suitable plywood, and methods for making the same are disclosed, e.g., in Engineered Wood Products, A Guide for Specifiers, Designers and Users, Stephen Smulski, PhD, Editor in Chief, PFS Research Foundation, Madison, Wis. especially Chapter 2, Plywood by Michael McKAy; or Wood Handbook, Wood as an Engineered Material, reprinted from Forest Products Laboratory General Technical Report FPL-GTR-113 with consent of the USDA Forest Service, Forest Products Laboratory, especially Chapter 10-6, Wood Based Composites and Panel Products, Plywood. Specifically, the plywood can be any suitable plywood as manufactured by, e.g., Georgia-Pacific, Boise-Cascade, Norbord Industries, Willamette, Roseburg Forest Products, Louisianna-Pacific, Weyerhaeuser, Hood Industries, Plum Creek, or Hunt Plywood Co.

As used herein, "elevated temperature" refers to any temperature above room temperature, 77° F. (25° C.). Typically, the elevated temperature can be above about 100° C. (212° F.), above about 150° C. (302° F.), above about 200° C. (392° F ), or up to about 250° C. (482° F.). Specifically, the elevated temperature can be about 77° F. (25° C.) to about 315° C. (599° F.), about 100° C. (212° F.) to about 315° C. (599 °F.), about 77° F. (25° C.) to about 218° C. (425° F.), about 100° C. (212° F.) to about 218 °C. (425° F.), or about 175° C. (374° F.) to about 218° C. (425° F.). Specifically, regarding oriented strand board (OSB) and methods for making the same, "elevated temperature" can be about 162° C. (325° F.) to about 246° C. (475° F.), can be about 177° C. (350° F.) to about 232° C. (450° F.), or about 191° C. (375° F.) to about 218° C. (425° F. Specifically, regarding plywood and methods for making the same, "elevated temperature" can be about 107° C. (225° F.) to about 218° C. (425° F.), about 121° C. (250° F.) to about 204° C. (400° F.), or about 135° C. (275° F.) to about 191° C. (375° F.).

As used herein, "elevated pressure" refers to any pressure above standard pressure, 1 atm. (14.7 psi). Typically, the elevated pressure can be above about 5.0 atm (73.5 psi), above about 10.0 atm (146.9 psi), above about 20.0 atm (293.9 psi), above about 40.0 atm (587.8 psi), or above about 80.0 atm (1175.7 psi). Specifically, the elevated pressure can be about 60.0 atm. (881.8 psi) to about 85.0 atm (1249 psi). Specifically, regarding oriented strand board (OSB) and methods for making the same, "elevated pressure" can be about 25 atm. (367 psi) to about 55 atm. (808 psi), about 30 atm. (441 psi) to about 50 atm. (735 psi), about 34 atm. (500 psi) to about 48 atm. (705 psi), or about 35 atm. (514 psi) to about 45 atm. (661 psi). Specifically, regarding plywood and methods of making the same, "elevated pressure" can be about 8.0 atm. (118 psi) to about 21 atm (309 psi) or about 10.0 atm. (147 psi) to about 17 atm (250 psi).

As used herein, "resin" refers to an adhesive polymer of either natural or synthetic origin. As used herein, a "polymer" is a compound formed by the reaction of simple molecules having functional groups that permit their combination to proceed to higher molecular weights under suitable conditions. Synthetic polymers are chemically designed and formulated into the adhesive to perform a variety of bonding functions.

As used herein, "surface" refers to the outermost boundary of a substrate (e.g., flake, veneer, OSB, or plywood). The surface includes the top surface, the bottom surface and optionally the side surfaces.

As used herein, "impregnate" refers to the filling, permeation, insemination, or saturation of a material such as a resin, pesticide, or fungicide into a substrate (e.g., flake, veneer, OSB, or plywood).

As used herein, "completely impregnate" refers to about 100% impregnation of a material such as a resin, pesticide, or fungicide into a substrate (e.g., flake, veneer, OSB, or plywood).

As used herein, "partially impregnate" refers to an impregnation of a material such as a resin, pesticide, or fungicide into a substrate (e.g., flake, veneer, OSB, or plywood), of less than about 100%. The impregnation can be up to about 1/10 of the substrate, up to about 1/4 of the substrate, up to about 1/2 of the substrate, up to about 3/4 of the substrate, or up to about 99/100 of the substrate. More specifically, the impregnation can be about 1/20 to about 1/2 of the substrate.

As used herein, "fungi" or "fungus" refers to a large and diverse group of eucaryotic microorganisms whose cells contain a nucleus, vacuoles, and mitochondria Fungi include algae, molds, yeasts, mushrooms, and slime molds. See, Biology of Microorganisms, T. Brock and M. Madigan, $6^{th}$ Ed., 1991, Prentice Hill (Englewood Cliffs, N.J.). Exemplary fungi include *Ascomycetes* (e.g., *Neurospora, Saccharomyces, Morchella*), *Basidiomycetes* (e.g., *Amanita, Agaricus*), *Zygomycetes* (e.g., *Mucor, Rhizopus*), *Oomycetes* (e.g., *Allomyces*), and *Deuteromycetes* (e.g., *Penicillium, Aspergillus*).

As used herein, "algae" refers to a large and diverse assemblage of eucaryotic organisms that contain chlorophyll and carry out oxygenic photosynthesis. See, Biology of Microorganisms, T. Brock and M. Madigan, $6^{th}$ Ed., 1991, Prentice Hill (Englewood Cliffs, N.J.). Exemplary algae include Green Algae (e.g., *Chlamydomonas*), Euglenids (e.g., *Euglena*), Golden Brown Algae (e.g., *Navicula*), Brown Algae (e.g., *Laminaria*), Dinoflagellates (e.g., *Gonyaulax*), and Red Algae (e.g., *polisiphonia*).

As used herein, "mold" refers to a filamentous fungus, generally a circular colony that may be cottony, wooly, etc. or glabrous, but with filaments not organized into large fruiting bodies, such as mushrooms. See, e.g., Stedman's Medical Dictionary, $25^{th}$ Ed., Williams & Wilkins, 1990 (Baltimore, Md.). One exemplary mold is the *Basidiomycetes* called wood-rotting fungi. Two types of wood-rotting fungi are the white rot and the brown rot. An ecological activity of many fungi, especially members of the *Basidiomycetes* is the decomposition of wood, paper, cloth, and other products derived from natural sources. *Basidiomycetes* that attack these products are able to utilize cellulose or lignin as carbon and energy sources. Lignin is a complex polymer in which the building blocks are phenolic compounds. It is an important constituent of woody plants. The decomposition of lignin in nature occurs almost exclusively through the agency of these wood-rotting fungi. Brown rot attacks and decomposes the cellulose and the lignin is left unchanged. White rot attacks and decomposes both cellulose and lignin. See, Biology of Microorganisms, T. Brock and M. Madigan, $6^{th}$ Ed., 1991, Prentice Hill (Englewood Cliffs, N.J.).

As used herein, "yeast" refers to unicellular fungi, most of which are classified with the *Ascomytes*. See, Biology of Microorganisms, T. Brock and M. Madigan, $6^{th}$ Ed., 1991, Prentice Hill (Englewood Cliffs, N.J.).

As used herein, "mushrooms" refer to filamentous fungi that are typically from large structures called fruiting bodies, the edible part of the mushroom. See, Biology of Microorganisms, T. Brock and M. Madigan, $6^{th}$ Ed., 1991, Prentice Hill (Englewood Cliffs, N.J.).

As used herein, "slime molds" refers to nonphototrophic eucaryotic microorganisms that have some similarity to both fungi and protozoa The slime molds can be divided into two groups, the cellular slime molds, whose vegetative forms are composed of single amoebalike cells, and the acellular slime molds, whose vegetive forms are naked masses of protoplasms of indefinite size and shape called plasmodia. Slime molds live primarily on decaying plant matter, such as wood, paper, and cloth. See, Biology of Microorganisms, T. Brock and M. Madigan, $6^{th}$ Ed., 1991, Prentice Hill (Englewood Cliffs, N.J.).

As used herein, "fungal resistant" refers to a substrate (e.g., wood-based composite panel) that has no appreciable amount of fungus present or growing on the surface therein The amount, if any, fungus present or growing on the surface will typically be less than about 25%, less than about 10%, less than about 5%, or less than about 1% of the fungus present or growing on the surface of an equivalent substrate that is non-fungal resistant. The fungal resistant substrate will typically include a chemical that will kill, destroy, inhibit, or inactivate a eucaryotic microorganism to prevent growth. Exemplary eucaryotic microorganisms include algae, fungi, slime mold, protozoa, and eucaryotes in the microbial world.

As used herein, a "fungal resistant wood-based composite panel" refers to a wood-based composite panel, as defined herein, that is fungal resistant. The fungal resistant wood-based composite panel possesses the ability to kill, destroy, inhibit, or inactivate a fungus thereby preventing growth more than had the wood-based composite panel not include a fungicide. Specifically, the amount, if any, fungus present and growing on the surface will typically be less than about 25%, less than about 10%, less than about 5%, or less than about 1% of the fungus present and growing on the surface of an equivalent substrate that is non-fungal resistant and does not include a fungicide.

The fungal resistant wood-based composite panel will preferably meet the necessary requirements to be certified as a fungal resistant wood-based composite panel. In doing so, the fungal resistant wood-based composite panel, upon testing, will be approved by the relevant building codes and insurance rating bureaus typically known to those of skill in the art. The fungal resistant wood-based composite panel, upon testing, will meet or exceed the requirements of a fungal resistant wood-based composite panel, as promulgated by the relevant code sections for one or more of the following entities: Building Officials and Code Administrators International, Inc. (BOCA) National Building Code; Standard Building Code (SBC); Uniform Building Code (UBC); American Society for Testing Materials (ASTM); American Wood-Preservers' Association (AWPA); Underwriters Laboratories, Inc. (UL); U.S. Department of Defense (DOD); Military Specification (Mil); City of Los Angeles, Calif.; City of New York, N.Y. Building Code; International Conference of Building Officials (ICBO); and Southern Building Code Congress International, Inc. (SBCCI).

The fungal resistant wood-based composite panel can either be surface treated or integrally treated. As used herein, a "surface treated wood-based composite panel" refers to a wood-based composite panel wherein flakes or veneers present only on the outwardly facing surface(s) of the OSB or plywood are treated with a pesticide, fungicide, or combination thereof. As used herein, a "integrally treated wood-based composite panel" refers to a wood-based composite panel wherein each flake or veneer is treated with a pesticide, fungicide, or combination thereof. Such flakes or veneers may me present on both the outside and the inside of the OSB or plywood.

As used herein, a "fungicide" or "antifungal agent" refers to a chemical that will kill, destroy, inhibit, or inactivate a fungus to prevent growth. The chemical can be synthetic or biosynthetic and can include both organic and inorganic compounds. The fungicide can be a solid (e.g., powder), liquid, or a combination thereof. See, e.g., Concise Chemical and Technical Dictionary, Fourth Enlarged edition, Bennett, Chemical Publishing Company, NY, N.Y. (1986); and McGraw-Hill Concise Encyclopedia of Science & Technology, Fourth Edition, Parker, McGraw-Hill, NY, N.Y., (1998). Specifically, "fungicide" or "antifungal agent" can include a chemical that will kill, destroy, inhibit, or inactivate a eucaryotic microorganism to prevent growth. Exemplary eucaryotic microorganisms include algae, fungi, slime mold, protozoa, and eucaryotes in the microbial world.

As used herein, "termite resistant" refers to a substrate (e.g., wood-based composite panel) that has no appreciable amount of termites that eat a portion of the substrate. The amount, if any, termites that eat a portion of the substrate will typically be less than about 25%, less than about 10%, less than about 5%, or less than about 1% of the termites that would eat a portion of an equivalent substrate that is non-fungal resistant. "Termite resistant" refers to a substrate having the ability to prevent, mitigate, or lessen the likelihood of termites from eating, consuming or otherwise degrading a wood-based composite panel more so than had the substrate not include a pesticide.

As used herein, a "termite resistant wood-based composite panel" refers to a wood-based composite panel, as defined herein, that is termite resistant. The termite resistant wood-based composite panel will preferably meet the necessary requirements to be certified as a termite resistant wood-based composite panel. In doing so, the termite resistant wood-based composite panel, upon testing, will be approved by the relevant building codes and insurance rating bureaus typically known to those of skill in the art. The termite resistant wood-based composite panel, upon testing, will meet or exceed the requirements of a termite resistant wood-based composite panel, as promulgated by the relevant code sections for one or more of the following entities: Building Officials and Code Administrators International, Inc. (BOCA) National Building Code; Standard Building Code (SBC); Uniform Building Code (UBC); American Society for Testing Materials (ASTM); American Wood-Preservers' Association (AWPA); Underwriters Laboratories, Inc. (UL); U.S. Department of Defense (DOD); Military Specification (Mil); City of Los Angeles, Calif.; City of New York, N.Y. Building Code; International Conference of Building Officials (ICBO); and Southern Building Code Congress International, Inc. (SBCCI).

As used herein, a "pesticide" refers to a chemical that is used as an insecticide, fungicide, acaricide (miticide), herbicide, rodenticide, bactericide, parasiticide, nematicide, and others used against pests. The chemical is used for the mitigation, control, or elimination of animals or plants detrimental to human health or economy. The chemical can be synthetic or biosynthetic and can include both organic and inorganic compounds. The pesticide can be a solid (e.g., powder), liquid, or a combination thereof. See, e.g., Concise Chemical and Technical Dictionary, Fourth Enlarged edition, Bennett, Chemical Publishing Company, NY, N.Y. (1986); and McGraw-Hill Concise Encyclopedia of Science & Technology, Fourth Edition, Parker, McGraw-Hill, NY, N.Y., (1998). "Pesticide" refers to a substance, that when added to a wood-based composite panel, will diminish the likelihood of a termite from eating a portion of the wood-based composite panel, over the extended periods of time typically encountered with the lifespan of the wood-based composite panel (e.g., up to about 25 years, up to about 50 years, or up to about 100 years).

Termite Resistant and/or Fungal resistant OSB

The present invention provides a flake of wood and at least one of a fungicide and a pesticide; wherein the fungicide, pesticide, or combination thereof covers at least a portion of the surface of the flake of wood, at least partially impregnates the flake of wood, or covers at least a portion of the surface of the flake of wood and at least partially impregnates the flake of wood. The termite resistant flake of wood, fungal resistant flake of wood, or combination thereof can be useful as an intermediate or starting material, in the manufacturing of a termite resistant wood based composite panel, fungal resistant wood based composite panel, or a combination thereof. Alternatively, the termite resistant flake of wood, fungal resistant flake of wood, or combination thereof can be useful, as a product itself, e.g., as a termite resistant packaging material, fungal resistant packaging material, or combination thereof.

A termite resistant oriented strand board, fungal resistant oriented strand board, or combination thereof, can be manufactured by contacting flakes of wood with a resin; orienting, in alternate lengthwise and crosswise layers, the flakes of wood to provide a blanket of oriented flakes; and curing the resin by exposing the resin to at least one of an elevated temperature, an elevated pressure, and radiant energy; for a sufficient period of time to effectively cure the resin; wherein the flakes of wood are independently contacted with each of the pesticide and the fungicide at any suitable step.

Initially, logs pass through a flaker, where they are cut into thin strands (i.e., flakes) of wood. Before the logs pass through a flaker, the logs can optionally be heated, especially if the logs are below about 10° C. (50° F.). The logs can be heated in any suitable manner, provided the physical and chemical integrity of the wood is not compromised. For example, the logs can be heated in a pond of water having a temperature of up to about 80° C. (176° F.), up to about 60° C. (140° F.), or up to about 40° C. (104° F.). Specifically, the logs can be heated in a pond of water having a temperature of about 100° F. (38° C.) to about 110° F. (43° C.). In addition, the logs can be heated for more than about 1 hour. Specifically, the logs can be heated for about 1 hour to about 48 hours.

After the logs are cut into thin strands (i.e., flakes) of wood, the flakes can optionally be dried to remove at least some of the water present therein. The flakes can be dried in any suitable manner provided at least some of the water present therein is removed. For example, the flakes can be dried using a tumble dryer. The flakes can be dried under any suitable conditions (e.g., at a temperature of above about 40° C. (104° F.) for about 10 seconds or more), provided at least some of the water present therein is removed. Specifically, the flakes can be dried at about 150° F. (66° C.) to about 225° F. (107° C.) for about 8 minutes to about 10 minutes.

The flakes are contacted with a resin and then oriented in alternate lengthwise and crosswise layers on a sheet or screen to form a blanket of oriented strands of wood. The blanket of flakes can then be pressed (e.g., heated under pressure to compress the blanket to a suitable thickness). The flakes are also contacted with the pesticide, fungicide, or a combination thereof, at any suitable step. For example, prior to curing the resin, the flakes can be contacted with each of the pesticide and the fungicide.

Termite Resistant and/or Fungal Resistant Plywood

The present invention provides a veneer of wood and at least one of a fungicide and a pesticide; wherein the fungicide, pesticide, or combination thereof covers at least a portion of the surface of the veneer of wood, at least partially impregnates the veneer of wood, or covers at least a portion of the surface of the veneer of wood and at least partially impregnates the veneer of wood. The termite resistant veneer of wood, fungal resistant veneer of wood, or combination thereof can be useful as an intermediate or starting material, in the manufacturing of a termite resistant wood based composite panel, fungal resistant wood based composite panel, or a combination thereof. Alternatively, the termite resistant veneer of wood, fungal resistant veneer of wood, or combination thereof can be useful, as a product itself, e.g., as a termite resistant packaging material, fungal resistant packaging material, or combination thereof.

A termite resistant plywood, fungal resistant plywood, or combination thereof, can be manufactured by contacting veneers of wood with a resin; orienting, in alternate lengthwise and crosswise layers, the veneers of wood to provide a stack oriented veneers; and curing the resin by exposing the resin to at least one of an elevated temperature, an elevated pressure, and radiant energy; for a sufficient period of time to effectively cure the resin; wherein the veneers of wood are independently contacted with each of the pesticide and the fungicide at any suitable step.

Initially, the logs are debarked and then placed in a hot water vault for about 8 to about 12 hours. The logs are then placed in a lathe, where a spindle knife cuts the logs into veneers of wood. The veneers are clipped in pieces about 4 feet or less in width. The clipped pieces are manually sorted into face sheets, filler sheets, and core sheets. These green veneers are optionally stored or directly placed into a dryer for a suitable period of time to remove at least some of the water present therein. The dried veneers are either stored or used directly in the mill. The dried veneers are contacted with a resin and then oriented in alternate lengthwise and crosswise layers on a sheet or screen to form a stack of oriented veneers of wood. The stack of oriented veneers of wood can then be pressed (e.g., heated under pressure to compress the stack to a suitable thickness). The veneers are also contacted with the pesticide, fungicide, or a combination thereof, at any suitable step. For example, prior to curing the resin, the veneers can be contacted with each of the pesticide and the fungicide.

Specifically, the veneers can be contacted with the pesticide and/or the fungicide off line. More specifically, the veneers can be contacted with each of the pesticide and the fungicide off line. More specifically, prior to drying the veneers, the veneers can be contacted with each of the pesticide and the fungicide off line. More specifically, prior to drying the veneers, the veneers can be contacted with each of the pesticide and the fungicide by dipping the veneers into the pesticide and the fungicide. Alternatively, prior to drying the veneers, the veneers can be contacted with each of the pesticide and the fungicide by spraying the veneers with the pesticide and the fungicide.

Specifically, after drying the veneers, the veneers can be contacted with each of the pesticide and the fungicide off line. More specifically, after drying the veneers, the veneers can be contacted with each of the pesticide and the fungicide by dipping the veneers into the pesticide and the fungicide. Alternatively, after drying the veneers, the veneers can be contacted with each of the pesticide and the fungicide by spraying the veneers with the pesticide and the fungicide.

A termite resistant plywood, fungal resistant plywood, or combination thereof, can be manufactured by contacting veneers of wood with a resin; stacking the of veneers of wood to form a stack; and curing the resin by exposing the resin to at least one of an elevated temperature, an elevated pressure, and radiant energy; for a sufficient period of time to effectively cure the resin; wherein the veneers of wood are independently contacted with each of the pesticide, the fungicide, or a combination thereof, at any suitable step.

Species of Timber

Any suitable species of timber (i.e., wood) can be employed to make the termite resistant OSB, fungal resistant OSB, or combination thereof; or the termite resistant plywood, fungal resistant plywood, or combination thereof. In addition, the termite resistant OSB, fungal resistant OSB, or combination thereof; or the termite resistant plywood, fungal resistant plywood, or combination thereof, can be manufactured from one or more suitable species of timber. Suitable types of timber include, e.g., Western, Northern (and Appalachian), and Southern timber.

Suitable Western timbers include, e.g., Incense-Cedar, Port-Orford-Cedar, Douglas Fir, White Fir, Western Hemlock, Western Larch, Lodgepole Pine, Ponderosa Pine, Sugar Pine, Western White Pine, Western Redcedar, Redwood, Engelmann Spruce, Sitka Spruce, Yellow-Cedar, Red Alder, Oregon Ash, Aspen, Black Cottonwood, California Black Oak, Oregon White Oak, Big Leaf Maple, Paper Birch, and Tanoak.

Suitable Northern (and Appalachian) timbers include, e.g., Northern White Cedar, Balsam Fir, Eastern Hemlock, Fraser Fir, Jack Pine, Red Pine, Eastern White Pine, Eastern Red Cedar, Eastern Spruce, Tamarack, Ash, Aspen, Basswood, Buckeye, Butternut, American Beech, Birch, Black Cherry, American Chestnut, Cottonwood, Elm, Hack Berry, True Hickory, Honey Locust, Black Locust, Hard maple, Soft Maple, Red Oak, White Oak, American Sycamore, Black Walnut, and Yellow-Poplar.

Suitable Southern timbers include, e.g., Atlantic White Cedar, Bald Cypress, Fraser Fir, Southern Pine, Eastern Red Cedar, Ash, Basswood, Arnecan, Beech, Butternut, Cottonwood, Elm, Hackberry, Pecan Hickory, True Hickory, Honey Locust, Black Locust, Magnolia, Soft Maple, Red Oaks, Sassafras, Sweetgum, American Sycamore, Tupelo, Black Walnut, Black Willow, and Yellow Poplar.

Resin

As described herein, the flakes or veneers are contacted with a resin. The flakes or veneer are subsequently cured to mechanically and chemically bind the resin to the flakes or veneers. Such curing can typically be accomplished by exposing the resin and flakes or the resin and veneers to elevated temperatures, elevated pressures, and/or radiant energy (e.g., UV, electron beam, microwave, beta radiation, gamma radiation, neutron beam, proton beam, infra red, etc.) for a sufficient period of time to effectively cure the resin. Upon curing, the resin can impregnate the flakes or the veneers, or the resin can remain on the outer surface of the flakes or the veneers. The curing provides an OSB or plywood wherein the resin is mechanically and chemically bound to the flakes or the veneers. The chemical bonding results in the formation of chemical linkages between the resin and the cellulose and hemicellulose in the flakes or the veneers.

The resin (i.e., adhesive polymer) can either be a thermoplastic polymer or a thermosetting polymer. Thermoplastic polymers are long-chain polymers that soften and flow on heating, then harden again by cooling. They generally have less resistance to heat, moisture, and long-term static loading than do thermosetting polymers. Common wood adhesives that are based on thermoplastic polymers include, e.g., polyvinyl acetate emulsions, elastomerics, contacts, and hot-melts. Alternatively, thermosetting polymers undergo irreversible chemical change, and on reheating, they do not soften and flow again. They form cross-linked polymers that have strength, have resistance to moisture and other chemicals, and are rigid enough to support high, long-term static loads without deforming. Suitable resins that are based on thermosetting polymers include, e.g., phenolic, resorcinolic, melamine, isocyanate, urea, and epoxy.

The suitable resin can be of natural origin, can be of synthetic origin, or can include resins of a combination thereof. Suitable resins of natural origin include, e.g., animal protein, blood protein, casein protein, soybean protein, lignocellulostic residue and extracts, bark-based resins, and combinations thereof. Suitable resins of synthetic origin include, e.g., cross-linkable polyvinyl acetate emulsion, elastomeric contact, elastomeric mastic, emulsion polymer/isocyanate, epoxy, hot melt, isocyanate, formaldehyde, melamine and melamine urea, phenolic, polyvinyl acetate emulsion, polyurethane, resorcinol and phenol resorcinol, urea, and combinations thereof.

Specifically, the resin can include an isocyanate resin, a melamine resin, a phenol-formaldehyde (PF) resin, a melamine-formaldehyde (MF) resin, a phenol-melamine-formaldehyde (PMF) resin, a melamine-urea-formaldehyde (MUF) resin, a phenol-melamine-urea-formaldehyde (PMUF) resin, or a combination thereof. More specifically, the resin can be a melamine resin, e.g., phenol-melamine-formaldehyde (PMF) resin which is commercially available from ARC Resins Corporation (Longueuil, Quebec, Canada) or Borden Chemical Inc. (Columbus, Ohio). PMF Resin is a phenol-melamine-formaldehyde copolymer.

Any suitable isocyanate can be employed. Suitable isocyanates include, e.g., PMDI (polymethylenedipenyl-4,4'-diisocyanate); MDI (methylene diphenyl diisocyanate), or a combination thereof. Additional suitable isocayantes are disclosed, e.g., in Aldrich Catalogue (Milwaukee, Wis.).

The phenol can optionally be substituted. Suitable substituted phenols include, e.g., alkyl substituted phenols, aryl substituted phenols, cycloalkyl substituted phenols, alkenyl substituted phenols, alkoxy substituted phenols, aryloxy substituted phenols, and halogen substituted phenols, as disclosed in U.S. Pat. No. 5,700,587. Additional suitable substituted phenols are disclosed, e.g., in U.S. Pat. No. 6,132,549.

The formaldehyde can optionally be replaced with another suitable aldehyde. Suitable aldehydes include, e.g., formaldehyde, acetaldehyde, propionaldehyde, furfuraldehyde and benzaldehyde. In general, the aldehyde employed can have the formula R'CHO wherein R' is a hydrogen or a hydrocarbon radical of 1 to about 12 carbon atoms. Specifically, the aldehyde can be formaldehyde. Suitable additional aldehydes are disclosed, e.g., in U.S. Pat. No. 5,700,587 and Aldrich Catalogue (Milwaukee, Wis.).

The resin can be a solid (e.g., powder) or a liquid. If the resin is a liquid, the liquid resin can be relatively viscous or relatively non-viscous. If the resin is a liquid and is relatively viscous, the resin can optionally be diluted with one or more carriers to render the resin relatively non-viscous. Suitable carriers include, e.g., water, organic hydrocarbons, or a combination thereof.

Additional suitable resins can be found, e.g., in the *Handbook of Thermoset Plastics; Wood Handbook*, sections 9–16, 9—9, 10-3, and 10-4; *Forest Products Society Publications* (http://www.forestprod.org); *Wood Adhesives* 2000, extended abstracts cat. No. 7260; *International Contributions to Wood Adhesion Research*, cat. No. 7267; *Wood Adhesives* 1999, cat. No. 7296; 1998 *Resin Binding Seminar Proceedings*, cat. No. 7266; *Handbook of Pressure Sensitive Adhesive Technology*, 3rd Edition by Donatas Satas, Hardcover; *Handbook of Adhesive Technology*, by A. Pizzi, K. L. Mittal, Hardcover; *Resin Transfer Moulding*, by Kevin Potter, Hardcover, and *Cyanoacrylate Resins: The Instant Adhesives*, by Henry L. Lee, Paperback, T/C Press, January 1986; and references cited therein.

Additional suitable resins can be found, e.g., in U.S. Pat. Nos. 6,136,408; 6,132,549; 4,758,478; 5,700,587; 5,635,118; 5,714,099; 4,364,984; 4,407,999; 4,514,532; 5,425,908; 5,552,095; 5,554,429; 5,861,119; 5,951,795; 5,974,760; 6,028,133; 6,132,885; and references cite therein.

Some suitable resins are commercially available from, e.g., Borden Chemical Inc. (Columbus, Ohio) and ARC Resins Corporation (Longueuil, Canada).

The resin can be cured, e.g., under a suitable pressure and temperature for a sufficient period of time effective to cure the resin. The length of time will typically depend upon the desired thickness of the OSB or the plywood. The length of time can be up to about 1 minute, up to about 2 minutes, up to about 3 minutes, up to about 4 minutes, up to about 5 minutes, or up to about 10 minutes. Typically, the length of time can be about 3.5 minutes to about 7.5 minutes. For example, for ⅜ inch (9.52 mm) OSB, the length of time can be about 230 seconds to about 240 seconds, for 7/16 inch (11.11 mm) OSB, the length of time can be about 230 seconds to about 240 seconds, for ¹⁵⁄₃₂ inch (11.9 mm) OSB, the length of time can be about 260 seconds to about 270 seconds, for ½ inch (12.7 mm) OSB, the length of time can be about 280 seconds to about 290 seconds, for ⅝ inch (15.88 mm) OSB, the length of time can be about 360 seconds to about 370 seconds, and for ¾ inch (19 mm) OSB, the length of time can be about 420 seconds to about 440 seconds.

The resin, upon curing, will preferably impart water-resistance and weather resistance upon the OSB or the plywood. The specific resin employed, prior to curing, will typically not undergo chemical or physical decomposition, to any appreciable degree, such that the resin will not cure. Additionally, the specific resin employed, after curing, will remain stable throughout the subsequent OSB or plywood process step(s).

The resin may require the presence of a catalyst and/or accelerator to cure the resin. Any suitable catalyst and/or accelerator can be employed, provided the resin effectively cures in a suitable period of time and the resin, upon curing, remains chemically and physically stable. Suitable catalysts include acid catalysts (e.g., formic acid), base catalysts (e.g., sodium hydroxide, calcium hydroxide, potassium hydroxide, or soda ash), salt catalysts, peroxide catalysts, and sulfur compounds. Additionally, the resin can optionally include hardeners (e.g., amine hardeners added to epoxy and formaldehyde hardener added to resorcinol) to produce cross-linking reactions to solidify the resin; antioxidants; acid scavengers; preservatives; wetting agents; defoamers; plasticizers; thickeners; and/or colorants. See, e.g., U.S. Pat. Nos. 6,132,549; 5,498,647; 5,700,587; 4,514,532; and 4,758,478.

The resin, prior to or upon curing, can impregnate the flake or the veneer. Specifically, the resin, prior to or upon curing, can completely impregnate the flake or the veneer (i.e., the resin is completely embedded in the flake or the veneer). Alternatively, the resin, prior to or upon curing, can partially impregnate the flake or the veneer. Specifically, the resin, prior to or upon curing, can impregnate up to about ⅟₁₀ of the flake or the veneer, up to about ¼ of the flake or the veneer, up to about ½ of the flake or the veneer, up to about ¾ of the flake or the veneer, or up to about ⁹⁹⁄₁₀₀ of the flake or the veneer. More specifically, the resin, prior to or upon curing, can impregnate about ⅟₂₀ to about ½ of the flake or the veneer.

Step(s) in Which Resin is Added to Flakes

The flakes of wood can be contacted with the resin at any suitable step to provide a termite resistant wood-based composite panel (e.g., termite resistant OSB), a fungal resistant wood-based composite panel (e.g., fungal resistant OSB), or combination thereof, provided: (1) the resin effectively cures during the pressing of the blanket of oriented flakes; and (2) the resin retains its effectiveness over the extended periods of time typically encountered with the lifespan of the termite resistant wood-based composite panel (e.g., termite resistant OSB), the fungal resistant wood-based composite panel (e.g., fungal resistant OSB), or combination thereof. The lifespan can be, e.g., up to about 25 years, up to about 50 years, or up to about 100 years.

Figure 2:
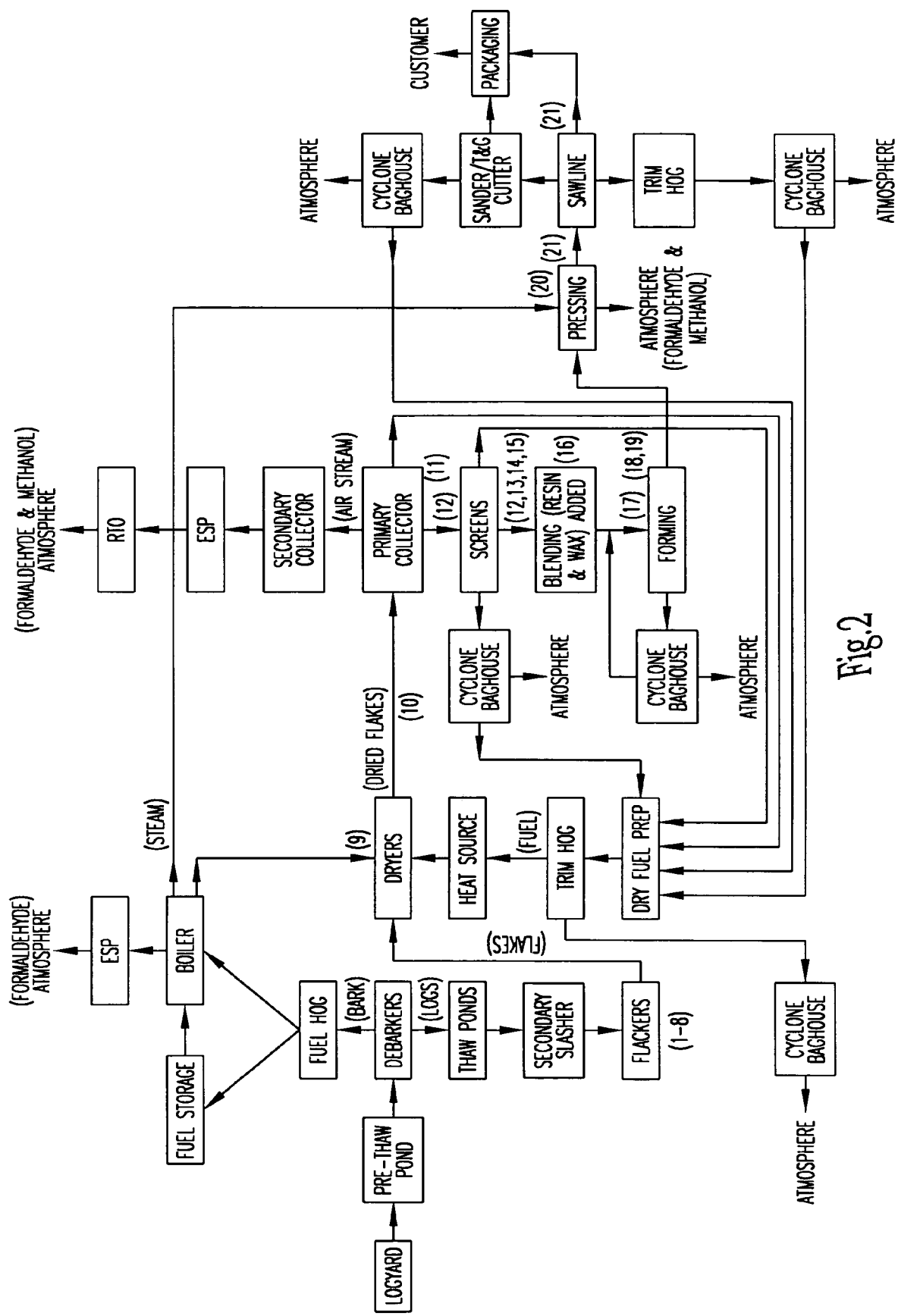
FIG. 2 illustrates a process flow of a termite resistant oriented strand board (OSB), a fungal resistant oriented stand board (OSB), or a combination thereof; wherein the possible locations and methods in which the resin and at least one of the pesticide and the fungicide could independently be introduced and applied are shown in numerals (which correspond to Tables I–IV).

As disclosed in Tables I and II and FIGS. 1–2, the flakes of wood can be contacted with the resin at any suitable step to provide a termite resistant wood-based composite panel (e.g., termite resistant and fungal resistant OSB), a fungal resistant wood-based composite panel (e.g., fungal resistant OSB), or combination thereof, provided: (1) the resin effectively cures during the pressing of the blanket of oriented flakes (i.e., pressing stage); and (2) the resin retains its effectiveness over the extended periods of time typically encountered with the lifespan of the termite resistant wood-based composite panel (e.g., termite resistant OSB), a fungal resistant wood-based composite panel (e.g., fungal resistant OSB), or a combination thereof. The lifespan can be, e.g., up to about 5 years, up to about 10 years, up to about 25 years, or up to about 50 years.

Specifically, the flakes of wood can be contacted with the resin after the flakes of wood are dried and before the flakes of wood are pressed.

Specifically, as disclosed in Tables I and II and FIGS. 1–2, the flakes of wood can be contacted with the resin at a flaker outfeed, on a flake conveyor belt, at a drop-out to green bins (pantlegs), at an entry to green bins, on the inside of a green bins, at a green bin outfeed (drop chute), at a screw auger pan to dryer, at a airlock separation, at a dryer infeed, at a 1$^{st}$ pass of 3 pass dryer, at a dryer outfeed, at a primary cyclone, at an airlock separation, at a reversing conveyor to dry bin or fire dump or conveyor to screens, at an inside dry bins, at a dry bin conveyor, at a scales, on a conveyor, inside a blender, at a forming line heads, at a forming line, at a caul plate or screen, at a steam injection in press, at a transfer to sawline or after sawline, or any combination thereof.

Specifically, the flakes of wood can be contacted with the resin inside the blender.

Method(s) to Apply the Resin to Flakes

The resin can be applied to the flakes in any suitable manner, provided: (1) the resin effectively cures during the pressing of oriented flakes (i.e., pressing stage); and (2) the resin retains its effectiveness over the extended periods of time typically encountered with the lifespan of the termite resistant wood-based composite panel (e.g., termite resistant OSB), a fungal resistant wood-based composite panel (e.g., fungal resistant OSB), or a combination thereof. The lifespan can be, e.g., up to about 25 years, up to about 50 years, or up to about 100 years.

Specifically, Tables I–II and FIGS. 1–2 illustrate suitable methods in which the flakes can be contacted with the resin. These suitable methods include, e.g., spraying, rolling, laminating, pressure injecting, dipping, and/or injecting the flakes with the resin. Specifically, the flakes can be contacted with the resin by spraying the flakes with the resin.

Specifically, the flake of wood can be contacted with the resin by spraying the resin onto the flake of wood. More specifically, the flake of wood can be contacted with the resin by dry spraying the powdered resin onto the flake of wood.

The following table illustrates possible locations and methods in which the resin can be introduced and applied to the flakes of wood, wherein the locations are shown in the accompanying figures herein below.

TABLE I

| Id. | Materials Handling Process-Generic | Application Location | Comments |
|---|---|---|---|
| 1. | Flaker to Convey system | Flaker Outfeed | |
| 2. | Convey to Green Bins | Flake Conveyor belt | |
| 3. | Convey to Green Bins | Drop-out to Green Bins (Pantlegs) | |
| 4. | Convey to Green Bins | Entry to Green Bins | |
| 5. | Green Bin | Inside Green Bins | Head end before doffing rolls |

TABLE I-continued

| Materials Handling Id. Process-Generic | Application Location | Comments |
|---|---|---|
| 6. Green Bin to Dryer | Green Bin Outfeed (drop chute) | |
| 7. Green Bin to Dryer | Screw auger pan to dryer | |
| Airlock Separation | Airlock Separation | Flakes are clumped and compressed |
| 8. Convey to Dryer | Dryer infeed | |
| 9. Inside Dryer | 1st Pass of 3 pass dryer | Could also be inside conveyor dryer |
| 10. Convey to Product Separator (Primary Cyclone) | Dryer Outfeed | Nozzles in dryer outfeed |
| 11. Product Separator Airlock Separation | Primary Cyclone Airlock Separation | |
| 12. Convey to Screens and Dry Bins | Reversing Conveyor to Dry Bin or Fire Dump or Conveyor to Screens | |
| 13. Dry Bin | Inside Dry Bins | Head end before doffing rolls |
| 14. Convey to scales Scales | Dry bin conveyor Scales | |
| 15. Convey to Blender | On conveyor | Dry Chemical and/or Resin - Together or separately |
| 16. Blender | Inside Blender | Dry Chemical, Liquid Resin / Liquid Chemical, Liquid Resin / Dry Chemical, Dry Resin / Liquid Chemical, Dry Resin |
| 17. Forming Heads | Forming Line Heads | Applying in forming head bins |
| 18. Forming | Forming Line | Spray on dry flake mat |

The following table illustrates additional possible locations and methods in which the resin can be introduced and applied to the flakes of wood. The locations are shown in the accompanying figures herein below.

TABLE II

| Materials Handling Id. Process-Generic | Application Location | Comments |
|---|---|---|
| 19. Convey | New Option: Pneumatic Conveyor | From Flaker to Green Bin - spray nozzles in pneumatic pipe |
| 20. Green Flake Blender | Somewhere between 1 and 5, or at 6 and 7, or 8 | Could be off-line operation, or integrated into line |
| 21. Pre-dry (flake) Operation | After flaker, re-introduce to Green Bin or Dryer | Could be off-line operation or integrated into line |
| 22. Pre-Dry (flake) Operation | New Equip Options: Radio Frequency Microwave Rotary Dryer Conveyor Dryer Fluidized Bed Low Headspace Drying | |
| 23. Pre-Dry or Dry | Conventional Line drying Options: Rotary Triple Pass Conveyor New Equipment: Single Pass Dryer Single Pass combination Blender/Dryer | |
| 24. Pre-Compression | Pre-compression | |
| 25. Separate Operation | roller On Conventional OSB | Similar to conventional post-production treating Spray Spread Dip Pressure Treat (Retort) Pressure Inject Laminate |

Pesticide and Fungicide

The flakes of wood can independently be contacted with a pesticide, fungicide, or combination thereof. Additionally, the veneers of wood can independently be contacted with a pesticide, fungicide, or combination thereof. Any suitable pesticide, fungicide, or combination thereof can be employed provided: (1) each retains their effectiveness (i.e., termite resistant properties, antifungal properties, or a combination thereof) during the manufacturing of the wood based composite panel; (2) each retains their effectiveness (i.e., termite resistant properties, antifungal properties, or a combination thereof) over the extended periods of time typically encountered with the lifespan of the wood based composite panel (e.g., up to about 25 years, up to about 50 years, or up to about 100 years); (3) each remains stable in the presence of the resin during the manufacture of the wood based composite panel; (4) each remains stable in the presence of the resin during the lifespan of the wood based composite panel (e.g., up to about 25 years, up to about 50 years, or up to about 100 years); (5) the resin effectively cures during the pressing stage in the manufacture of the wood based composite panel; (6) the resin retains its effectiveness over the extended periods of time typically encountered with the lifespan of the wood based composite panel (e.g., up to about 25 years, up to about 50 years, or up to about 100 years); (7) the resin remains stable in the presence of each during the manufacture of the wood based composite panel; and/or (8) the resin remains stable in the presence of each during the lifespan of the wood based composite panel (e.g., up to about 25 years, up to about 50 years, or up to about 100 years).

In one embodiment of the present invention, the pesticide and fungicide can be separate and distinct compounds. In another embodiment of the present invention, one compound can serve as both the pesticide and the fungicide. For example, it has surprisingly been discovered that an oriented strand board that includes copper ammonium acetate (CAA) can be both fungal resistant and termite resistant. As such, copper ammonium acetate (CAA) can serve as both a pesticide and a fungicide in the manufacture of an antifungal and termite resistant OSB.

Specifically, the fungicide can be any chemical that has been approved by the relevant controlling government agency, e.g., Environmental Protection Agency (EPA) or the Food and Drug Administration (FDA). Additionally, the fungicide will preferably comply with the Federal Insecticide, Fungicide, and the Rodenticide Act (FIFRA) by public law 92-516, the Federal Environmental Pesticide Control Act (FEPCA) of 1972.

Suitable fungicides include, e.g., formic acid, acetic acid, propionic acid, pelargonic acid, capric acid, copper ammonium acetate (CAA), copper naphthenate, or a combination thereof.

Specifically, the fungicide can include a copper-containing fungicide. More specifically, the fungicide can include copper ammonium acetate (CAA). CAA is commercially available as COMPTEC SOLUTION [Cas. Reg. No. 23087-46-9] from, e.g., Chemical Specialties, Inc. (Charlotte, N.C.).

Specifically, the pesticide can be any chemical that has been approved by the relevant controlling government agency, e.g., Environmental Protection Agency (EPA) or the Food and Drug Administration (FDA). Additionally, the pesticide will preferably comply with the Federal Insecticide, Fungicide, and the Rodenticide Act (FIFRA) by public law 92-516, the Federal Environmental Pesticide Control Act (FEPCA) of 1972.

Suitable pesticides are disclosed, e.g., at the food safety website (www.foodsafety.ufl.edu), the United Stated Department of Agriculture website (www.usda.gov), the Michigan Department of Agriculture website (www.mda.state.mi.us), and the Environmental Protection Agency's website (www.epa.gov).

Specifically, the pesticide can include a copper-containing pesticide. More specifically, the pesticide can include copper ammonium carbonate (CAC), which is commercially available as COMPSOL SOLUTION from, e.g., Chemical Specialties, Inc. (Charlotte, N.C.). Alternatively, the pesticide can include copper ammonium acetate (CAA). CAA is commercially available as COMPTEC SOLUTION [Cas. Reg. No. 23087-46-9] from, e.g., Chemical Specialties, Inc. (Charlotte, N.C.).

Specifically, the pesticide is an insecticide. Specifically, the insecticide is a chemical useful for the mitigation, control, or elimination of termites. As used herein, a "termite" refers to an insect, commonly known as the white ant, of the order Isoptera; where there are about 1600 species. Termites feed on cellulose; however, they do not possess an enzyme to digest this material. Instead, flagellate protozoan symbionts in the gut of the termites digest the cellulose or at least initiate its breakdown. See, McGraw-Hill Concise Encyclopedia of Science & Technology, Fourth Edition, Parker, McGraw-Hill, NY, N.Y., (1998).

The pesticide and fungicide should each possess suitable chemical and physical properties. Suitable chemical and physical properties include, e.g., the ability to resist decomposition caused by termites and fungal infections, ease in handling, weather resistance, and/or chemical and physical compatibility with the resin employed.

The suitable physical properties that the OSB of the present invention possess include, e.g., the ability of the OSB to resist termites; the ability of the OSB to resist fungal infections; the durability of the OSB over an extended period of time (e.g., up to about 50 years) under extreme humidity levels (e.g., up to about 100% relative humidity); the ability of the OSB to not absorb moisture (i.e., non-hygroscopic) even up to extreme humidity levels (e.g., up to about 100% relative humidity); the ability of the OSB not to bloom, and/or the OSB is weather resistance (e.g., rain, humidity, snow, freezing rain, etc.).

Hygroscopic organic and/or hygroscopic inorganic compounds should be avoided as ingredients in the fungicide, pesticide, or combination thereof. However, a hygroscopic compound could be present in an amount that would not prevent the fungicide, pesticide, or combination thereof to absorb an appreciable amount of water. Such an amount would typically be a trace amount (e.g., less than 0.1 wt. % of the fungicide, pesticide, or combination thereof). Exemplary hygroscopic compounds include, e.g., sodium salts such as borax and sodium phosphate, and sulfates.

Step(s) in Which Pesticide and/or Fungicide is Added

The flakes of wood can independently be contacted with a pesticide, fungicide, or combination thereof. Additionally, the veneers of wood can independently be contacted with a pesticide, fungicide, or combination thereof. In either case, the pesticide, fungicide, or combination thereof can be added at any suitable step, provided: (1) each retains their effectiveness (i.e., termite resistant properties, antifungal properties, or a combination thereof) during the manufacturing of the wood based composite panel; (2) each retains their effectiveness (i.e., termite resistant properties, antifungal properties, or a combination thereof) over the extended periods of time typically encountered with the lifespan of the wood based composite panel (e.g., up to about 25 years, up to about 50 years, or up to about 100 years); (3) each remains stable in the presence of the resin during the manufacture of the wood based composite panel; (4) each remains stable in the presence of the resin during the lifespan of the wood based composite panel (e.g., up to about 25 years, up to about 50 years, or up to about 100 years); (5) the resin effectively cures during the pressing stage in the manufacture of the wood based composite panel; (6) the resin retains its effectiveness over the extended periods of time typically encountered with the lifespan of the wood based composite panel (e.g., up to about 25 years, up to about 50 years, or up to about 100 years); (7) the resin remains stable in the presence of each during the manufacture of the wood based composite panel; and/or (8) the resin remains stable in the presence of each during the lifespan of the wood based composite panel (e.g., up to about 25 years, up to about 50 years, or up to about 100 years).

For example, as disclosed in Tables III and IV and FIGS. 1–2, the flakes of wood can independently be contacted with the pesticide, fungicide, or combination thereof at a flaker outfeed, on a flake conveyor belt, at a drop-out to green bins (pantlegs), at an entry to green bins, inside the green bins, at a green bin outfeed (drop chute), at a screw auger pan to dryer, at a airlock separation, at a dryer infeed, at a $1^{st}$ pass of 3 pass dryer, at a dryer outfeed, at a primary cyclone, at an airlock separation, at a reversing conveyor to dry bin or fire dump or conveyor to screens, on the inside of a dry bin, on a dry bin conveyor, at a scales, on a conveyor, inside a blender, at a forming line heads, at a forming line, at a caul plate or screen, at a steam injection in press, at a transfer to sawline or after sawline, or any combination thereof.

Specifically, the flakes of wood can independently be contacted with the pesticide, fungicide, or combination thereof inside the green bins, at a green bin outfeed (drop chute), or a combination thereof.

Methods to Apply the Pesticide and/or Fungicide

The pesticide, fungicide, or combination thereof can be applied to the flakes or to the veneers in any suitable manner, provided: (1) each retains their effectiveness (i.e., termite resistant properties, antifungal properties, or a combination thereof) during the manufacturing of the wood based composite panel; (2) each retains their effectiveness (i.e., termite resistant properties, antifungal properties, or a combination thereof) over the extended periods of time typically encountered with the lifespan of the wood based composite panel (e.g., up to about 25 years, up to about 50 years, or up to about 100 years); (3) each remains stable in the presence of the resin during the manufacture of the wood based composite panel; (4) each remains stable in the presence of the resin during the lifespan of the wood based composite panel (e.g., up to about 25 years, up to about 50 years, or up to about 100 years); (5) the resin effectively cures during the pressing stage in the manufacture of the wood based composite panel; (6) the resin retains its effectiveness over the extended periods of time typically encountered with the lifespan of the wood based composite panel (e.g., up to about 25 years, up to about 50 years, or up to about 100 years); (7) the resin remains stable in the presence of each during the manufacture of the wood based composite panel; and/or (8) the resin remains stable in the presence of each during the lifespan of the wood based composite panel (e.g., up to about 25 years, up to about 50 years, or up to about 100 years).

Specifically, Tables III and IV and FIGS. 1–2 illustrate suitable methods in which the flakes can independently be contacted with the pesticide, fungicide, or combination thereof. Suitable methods in which the flakes can independently be contacted with the pesticide, fungicide, or combination thereof include, e.g., spraying, rolling, laminating, pressure injecting, dipping, and/or injecting the flakes with the pesticide, fungicide, or combination thereof. Specifically, the flakes can independently be contacted with the pesticide, fungicide, or combination thereof by spraying the flakes with the pesticide, fungicide, or combination thereof.

TABLE III

| Materials Handling Id. Process-Generic | Application Location | Comments |
| --- | --- | --- |
| 1. Flaker to Convey system | Flaker Outfeed | |
| 2. Convey to Green Bins | Flake Conveyor belt | |
| 3. Convey to Green Bins | Drop-out to Green Bins (Pantlegs) | |
| 4. Convey to Green Bins | Entry to Green Bins | |
| 5. Green Bin | Inside Green Bins | Head end before doffing rolls |
| 6. Green Bin to Dryer | Green Bin Outfeed (drop chute) | |
| 7. Green Bin to Dryer | Screw auger pan to dryer | |
| Airlock Separation | Airlock Separation | Flakes are clumped and compressed |
| 8. Convey to Dryer | Dryer infeed | |
| 9. Inside Dryer | 1st Pass of 3 pass dryer | Could also be inside conveyor dryer |
| 10. Convey to Product Separator (Primary Cyclone) | Dryer Outfeed | Nozzles in dryer outfeed |
| 11. Product Separator Airlock Separation | Primary Cyclone Airlock Separation | |
| 12. Convey to Screens and Dry Bins | Reversing Conveyor to Dry Bin or Fire Dump or Conveyor to Screens | |
| 13. Dry Bin | Inside Dry Bins | Head end before doffing rolls |
| 14. Convey to scales Scales | Dry bin conveyor Scales | |
| 15. Convey to Blender | On conveyor | Dry Chemical and/or Resin - Together or separately |
| 16. Blender | Inside Blender | Dry Chemical, Liquid Resin Liquid Chemical, Liquid Resin Dry Chemical, Dry Resin Liquid Chemical, Dry Resin |
| 17. Forming Heads | Forming Line Heads | Applying in forming head bins |
| 18. Forming | Forming Line | Spray on dry flake mat |
| 19. Pressing | Caul Plate or screen | Apply going into press |
| 20. Pressing | Steam injection in press | |
| 21. After Pressing | Transfer to Sawline or After Sawline | Spreader or mist |

The following table illustrates additional possible locations and methods in which the pesticide, fungicide, or combination thereof can be introduced and applied to the flakes of wood. The locations are shown in the accompanying figures herein below.

TABLE IV

| Materials Handling Id. Process-Generic | Application Location | Comments |
| --- | --- | --- |
| 22. Convey | New Option: Pneumatic Conveyor | From Flaker to Green Bin - spray nozzles in pneumatic pipe |
| 23. Green Flake Blender | Somewhere between 1 and 5, or at 6 and 7, or 8 | Could be off-line operation, or integrated into line |
| 24. Pre-dry (flake) Operation | After flaker, re-introduce to Green Bin or Dryer | Could be off-line operation or integrated into line |
| 25. Pre-Dry (flake) Operation | New Equip Options: Radio Frequency Microwave Rotary Dryer Conveyor Dryer Fluidized Bed Low Headspace Drying | |
| 26. Pre-Dry or Dry | Conventional Line drying Options: Rotary Triple Pass Conveyor New Equipment: Single Pass Dryer Single Pass combination Blender/Dryer | |
| 27. Pre-Compression | Pre-compression roller | |
| 28. Separate Operation | On Conventional OSB | Similar to conventional post-production treating Spray Spread Dip Pressure Treat (Retort) Pressure Inject Laminate |

All publications, patents, and patent documents cited herein are incorporated by reference herein, as though individually incorporated by reference. The invention has been described with reference to various specific and preferred embodiments and techniques. However, it should be understood that many variations and modifications may be made while remaining within the spirit and scope of the invention.

It is appreciated that certain features of the invention, which are, for clarity, described in the context of separate embodiments, may also be provided in combination in a single embodiment. Conversely, various features of the invention which are for brevity, described in the context of a single embodiment, may also be provided separately or in any sub-combination.

What is claimed is:

1. A method for producing an oriented strand board comprising:
   (i) contacting flakes of wood with a resin;
   (ii) orienting, in alternate lengthwise and crosswise layers, the flakes of wood to provide a blanket of oriented flakes; and
   (iii) curing the resin by exposing the resin to at least one of an elevated temperature, an elevated pressure, and radiant energy; for a sufficient period of time;
   wherein the flakes of wood are independently contacted with the pesticide, fungicide, or combination thereof, at a flaker outfeed, on a flake conveyor belt, at a drop-out to green bins, at an entry to green bins, inside a green bins, at a green bin outfeed, at a screw auger pan to dryer, at a dryer infeed, at a 1st pass of 3 pass dryer, at a dryer outfeed, at a primary cyclone, at an airlock separation, at a reversing conveyor to dry bin or fire dump or conveyor to screens, on the inside of a dry bin, on a dry bin conveyor, at a scales, on a conveyor, inside a blender, at a forming line heads, at a forming line, at a caul plate or screen, at a steam injection in press, or any combination thereof.

2. The method of claim 1, wherein the flakes of wood are independently contacted with the pesticide, fungicide, or combination thereof, inside a green bins, at a green bin outfeed, or a combination thereof.

3. The method of claim 1, wherein the flakes of wood are independently contacted with the pesticide, fungicide, or combination thereof, by at least one of spraying, rolling, laminating, pressure injecting, dipping, and injecting the flakes with the pesticide, fungicide, or combination thereof.

4. The method of claim 1, wherein the flakes of wood are independently contacted with the pesticide, fungicide, or combination thereof, by spraying the flakes with the pesticide, fungicide, or combination thereof.

5. The method of claim 1 wherein the oriented strand board is fungal resistant.

6. The method of claim 1 wherein the oriented strand board is termite resistant.

7. The method of claim 1 wherein the resin comprises a thermosetting polymer.

8. The method of claim 7 wherein the thermosetting polymer comprises a phenolic resin, a formaldehyde resin, a melamine resin, a phenol-formaldehyde (PF) resin, a melamine-formaldehyde (MF) resin, a phenol-melamine-formaldehyde (PMF) resin, or a combination thereof.

9. The method of claim 1 wherein the resin comprises a phenol-melamine-formaldehyde (PMF) resin.

10. The method of claim 1 wherein the resin covers the entire surface of the flake of wood.

11. The method of claim 1 wherein the resin covers a portion of the surface of the flake of wood.

12. The method of claim 1 wherein the resin completely impregnates the flake of wood.

13. The method of claim 1 wherein the resin partially impregnates the flake of wood.

14. The method of claim 1 wherein the fungicide comprises formic acid, acetic acid, propionic acid, pelargonic acid, capric acid, copper ammonium acetate (CAA), copper naphthenate, or a combination thereof.

15. The method of claim 1 wherein the fungicide comprises copper ammonium acetate (CAA).

16. The method of claim 1 wherein the pesticide comprises copper ammonium carbonate (CAC).

17. The method of claim 1 wherein the fungicide, pesticide, or combination thereof covers the entire surface of the flake of wood.

18. The method of claim 1 wherein the fungicide, pesticide, or combination thereof covers a portion of the surface of the flake of wood.

19. The method of claim 1 wherein the fungicide, pesticide, or combination thereof impregnates the flake of wood.

20. The method of claim 1 wherein the fungicide, pesticide, or combination thereof completely impregnates the flake of wood.

21. The method of claim 1 wherein the fungicide, pesticide, or combination thereof partially impregnates the flake of wood.

22. The method of claim 1 wherein the elevated temperature is about 162° C. (325° F.) to about 246° C. (475° F.).

23. The method of claim 1 wherein the elevated temperature is about 177° C. (350° F.) to about 232° C. (450° F.).

24. The method of claim 1 wherein the elevated temperature is about 191° C. (375° F.) to about 218° C. (425° F.).

25. The method of claim 1 wherein the elevated pressure is about 25 atm. (367 psi) to about 55 atm. (808 psi).

26. The method of claim 1 wherein the elevated pressure is about 30 atm. (441 psi) to about 50 atm. (735 psi).

27. The method of claim 1 wherein the elevated pressure is about 34 atm. (500 psi) to about 48 atm. (705 psi).

28. The method of claim 1 wherein the elevated pressure is about 35 atm. (514 psi) to about 45 atm. (661 psi).

29. The method of claim 1 wherein the sufficient period of time is about 3.0 minutes to about 9.0 minutes.

30. A method for producing an oriented strand board comprising:
   (i) contacting flakes of wood with a resin;
   (ii) orienting, in alternate lengthwise and crosswise layers, the flakes of wood to provide a blanket of oriented flakes; and
   (iii) curing the resin by exposing the resin to at least one of an elevated temperature, an elevated pressure, and radiant energy; for a sufficient period of time;
   wherein the flakes of wood, prior to curing the resin, are contacted with a fungicide, pesticide or combination thereof, selected from the group of formic acid, acetic acid, propionic acid, pelargonic acid, capric acid, copper ammonium acetate (CAA), copper naphthenate, and combinations thereof.

31. The method of claim 30 wherein the oriented strand board is fungal resistant.

32. The method of claim 30 wherein the oriented strand board is termite resistant.

33. The method of claim 30 wherein the resin comprises a thermosetting polymer.

34. The method of claim 30 wherein the thermosetting polymer comprises a phenolic resin, a formaldehyde resin, a melamine resin, a phenol-formaldehyde (PF) resin, a melamine-formaldehyde (MF) resin, a phenol-melamine-formaldehyde (PMF) resin, or a combination thereof.

35. The method of claim 30 wherein the resin comprises a phenol-melamine-formaldehyde (PMF) resin.

36. The method of claim 30 wherein the resin covers the entire surface of the flake of wood.

37. The method of claim 30 wherein the resin covers a portion of the surface of the flake of wood.

38. The method of claim 30 wherein the resin completely impregnates the flake of wood.

39. The method of claim 30 wherein the resin partially impregnates the flake of wood.

40. The method of claim 30 wherein the fungicide is copper ammonium acetate (CAA).

41. The method of claim 30 wherein the pesticide is copper ammonium carbonate (CAC).

42. The method of claim 30 wherein the fungicide, pesticide, or combination thereof covers the entire surface of the flake of wood.

43. The method of claim 30 wherein the fungicide, pesticide, or combination thereof covers a portion of the surface of the flake of wood.

44. The method of claim 30 wherein the fungicide, pesticide, or combination thereof impregnates the flake of wood.

45. The method of claim 30 wherein the fungicide, pesticide, or combination thereof completely impregnates the flake of wood.

46. The method of claim 30 wherein the fungicide, pesticide, or combination thereof partially impregnates the flake of wood.

47. The method of claim 30 wherein the elevated temperature is about 162° C. (325° F.) to about 246° C. (475° F.).

48. The method of claim 30 wherein the elevated temperature is about 177° C. (350° F.) to about 232° C. (450° F.).

49. The method of claim 30 wherein the elevated temperature is about 191° C. (375° F.) to about 218° C. (425° F.).

50. The method of claim 30 wherein the elevated pressure is about 25 atm. (367 psi) to about 55 atm. (808 psi).

51. The method of claim 30 wherein the elevated pressure is about 30 atm. (441 psi) to about 50 atm. (735 psi).

52. The method of claim 30 wherein the elevated pressure is about 34 atm. (500 psi) to about 48 atm. (705 psi).

53. The method of claim 30 wherein the elevated pressure is about 35 atm. (514 psi) to about 45 atm. (661 psi).

54. The method of claim 30 wherein the sufficient period of time is about 3.0 minutes to about 9.0 minutes.

55. The method of claim 30, wherein the flakes of wood are independently contacted with the pesticide, fungicide, or combination thereof, at a flaker outfeed, on a flake conveyor belt, at a drop-out to green bins (pantlegs), at an entry to green bins, inside a green bins, at a green bin outfeed (drop chute), at a screw auger pan to dryer, at a airlock separation, at a dryer infeed, at a 1st pass of 3 pass dryer, at a dryer outfeed, at a primary cyclone, at an airlock separation, at a reversing conveyor to dry bin or fire dump or conveyor to screens, on the inside of a dry bin, on a dry bin conveyor, at a scales, on a conveyor, inside a blender, at a forming line heads, at a forming line, at a caul plate or screen, at a steam injection in press, or any combination thereof.

56. The method of claim 30, wherein the flakes of wood are independently contacted with the pesticide, fungicide, or combination thereof, inside a green bins, at a green bin outfeed (drop chute), or a combination thereof.

57. The method of claim 30, wherein the flakes of wood are independently contacted with the pesticide, fungicide, or combination thereof, by at least one of spraying, rolling, laminating, pressure injecting, dipping, and injecting the flakes with the pesticide, fungicide, or combination thereof.

58. The method of claim 30, wherein the flakes of wood are independently contacted with the pesticide, fungicide, or combination thereof, by spraying the flakes with the pesticide, fungicide, or combination thereof.

* * * * *

UNITED STATES PATENT AND TRADEMARK OFFICE
CERTIFICATE OF CORRECTION

PATENT NO. : 7,264,796 B2
APPLICATION NO. : 10/949045
DATED : September 4, 2007
INVENTOR(S) : Hejna et al.

It is certified that error appears in the above-identified patent and that said Letters Patent is hereby corrected as shown below:

On the Title page, in Item (56), under "Other Publications", in column 2, line 21, delete "Basidomycetes" and insert -- Basidiomycetes --, therefor.

In column 5, line 10, delete "wood," and insert -- wood; --, therefor.

In column 6, line 40, delete "stand" and insert -- strand --, therefor.

In column 8, line 43, delete "PhD," and insert -- Ph.D, -- therefor.

In column 9, line 3, after "(425° F." insert -- ). --.

In column 10, line 30, delete "Ascomytes." and insert -- Ascomycetes. --, therefor.

In column 10, line 40, after "protozoa" insert -- . --.

In column 10, line 51, after "therein" insert -- . --.

In column 16, line 9, delete "isocayantes" and insert -- isocyanates --, therefor.

In column 16, line 46, delete "Hardcover," and insert -- Hardcover; --, therefor.

Signed and Sealed this

Eighteenth Day of March, 2008

JON W. DUDAS
*Director of the United States Patent and Trademark Office*